United States Patent [19]

Lin

[11] Patent Number: 5,730,672

[45] Date of Patent: Mar. 24, 1998

[54] CUTTING METAL-WORKING MACHINE

[76] Inventor: Kwang-Jung Lin, 5F-23, 70, Fu-Shing Road, Taoyuan, Taiwan

[21] Appl. No.: 692,416

[22] Filed: Aug. 5, 1996

[51] Int. Cl.$^6$ ........................................ F16H 7/00
[52] U.S. Cl. ........................................ 474/88
[58] Field of Search ........................ 474/32, 84, 88

[56] References Cited

U.S. PATENT DOCUMENTS

| | | | |
|---|---|---|---|
| 2,084,234 | 6/1937 | Anderson et al. | 474/88 X |
| 2,346,731 | 4/1944 | Collins | 474/88 X |
| 2,566,579 | 9/1951 | Nichols | 474/88 X |
| 2,664,756 | 1/1954 | Fismer | 474/88 X |
| 2,689,620 | 9/1954 | Hainke | 474/88 X |
| 3,153,352 | 10/1964 | Sajovec et al. | 474/88 X |
| 3,191,452 | 6/1965 | Lipski et al. | 474/88 X |

*Primary Examiner*—Roger J. Schoeppel
*Attorney, Agent, or Firm*—Bacon & Thomas

[57] ABSTRACT

A stepless speed change device for cutting metal-working machines includes a drive gear set, a driven gear set, an intermediate gear set and two transmission belts. Each gear set includes an upper disk and a lower disk which are inter-engageable, and a resilient seat disposed therebetween so that the upper disk and lower disk may inter-engage and the upper disk may resiliently displace to open or close an opening defined between the upper and the lower disks. The intermediate gear set includes a first adjusting gear and a second adjusting gear respectively at an upper end and a lower end thereof such that when the first adjusting gear is in an open state, the second adjusting gear is in a closed state, and two rotating devices for controlling the first and second adjusting gears to synchronously displace therewith to control the size of openings through which the transmission belts pass. The transmission belts are respectively fitted between the drive gear set and the second adjusting gear as well as between the driven gear set and the first adjusting gear. By means of the rotating devices adjusting the displacement of the transmission belt at the first and second adjusting gears, the displacement of the transmission belt at the drive gear set and the driven gear set may be adjusted to achieve stepless speed change.

5 Claims, 6 Drawing Sheets

CUTTING METAL-WORKING MACHINE

BACKGROUND OF THE INVENTION

1. Field of the Invention

The present invention relates generally to a stepless speed change device for cutting metal-working machines, and more particularly to a stepless speed change device in which transmission displacement of transmission belts between a drive gear set and a driven gear set may be steplessly adjusted.

2. Description of the Prior Art

With reference to FIG. 1, a prior speed change device of a cutting metal-working machine comprises a drive gear set 1', a driven gear set 2' and a transmission belt 3'. The drive gear set 1' includes three gears all of a different diameter arranged vertically in order of size with the smallest one on top. The driven gear set 2' also includes three gears all of a different diameter arranged vertically in order of size but with the largest one on top. The drive gear set 1' is pivotally mounted on a motor to cause the transmission belt 3' to turn so as to rotate the driven gear set 2'. The transmission belt 3' is passed between the drive gear set 1' and the driven gear set 2' in a top-to-bottom arrangement so that the former may drive the latter to achieve in sequence three different rotational speed, i.e., low, medium and high.

For operations in which more flexibility in rotational speeds is required, the above-mentioned prior art which is able to achieve only three rotational speeds certainly fails to meet the need. Besides, with the prior art, it is necessary to use manual operation to shift the transmission belt 3' in order to allow for speed change of the shaft. Oftentimes, due to the tension of the transmission belt 3', it is very inconvenient to adjust the transmission belt 3'. Possible accidents may incur as well. Improvements on the prior art is therefore necessary.

SUMMARY OF THE INVENTION

Accordingly, a primary object of the present invention is to provide a stepless speed change device for cutting metal-working machines which is safe and simple to operate.

In order to achieve the above object, the stepless speed change device according to the present invention essentially comprises an upper disk and a lower disk for a drive gear set and a driven gear set, the upper and lower disks being inter-engageable and provided with corresponding resilient seats to control the size of an opening defined between the upper and lower disks, and an intermediate gear set for controlling and adjusting the displacement of the transmission belts and thus controlling the speed change of the drive gear set and the driven gear set.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
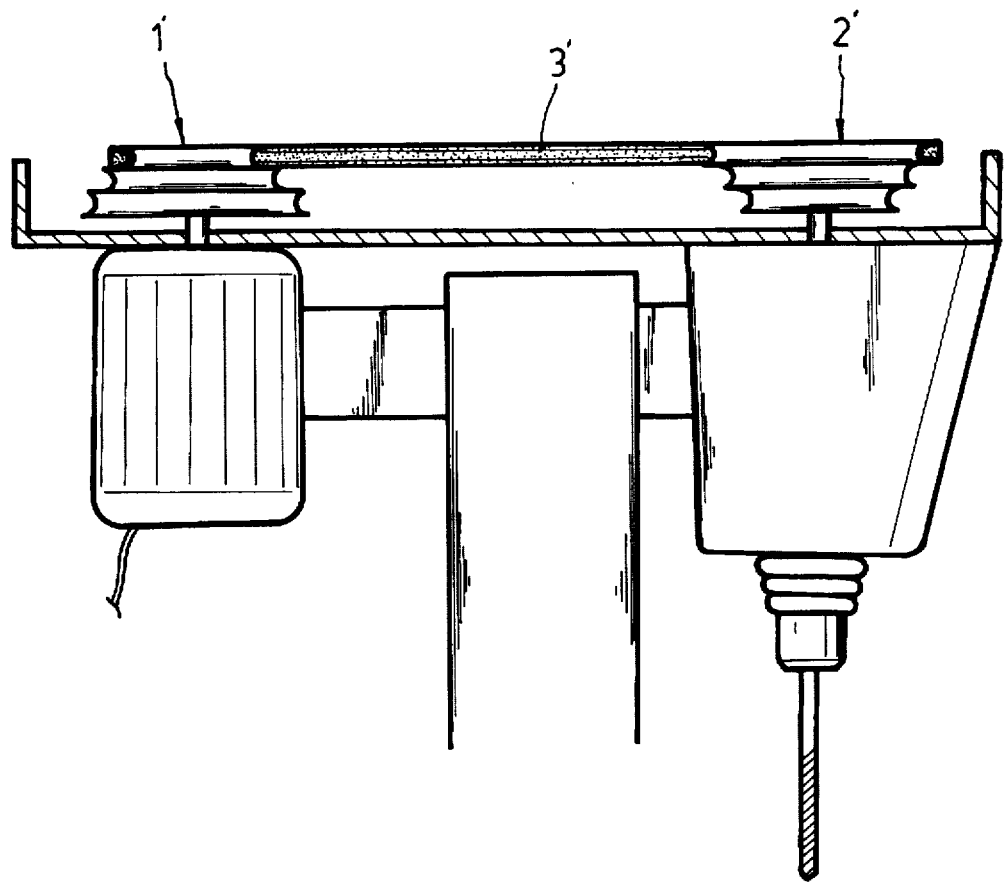
FIG. 1 is a schematic view of the prior art.
Figure 2:
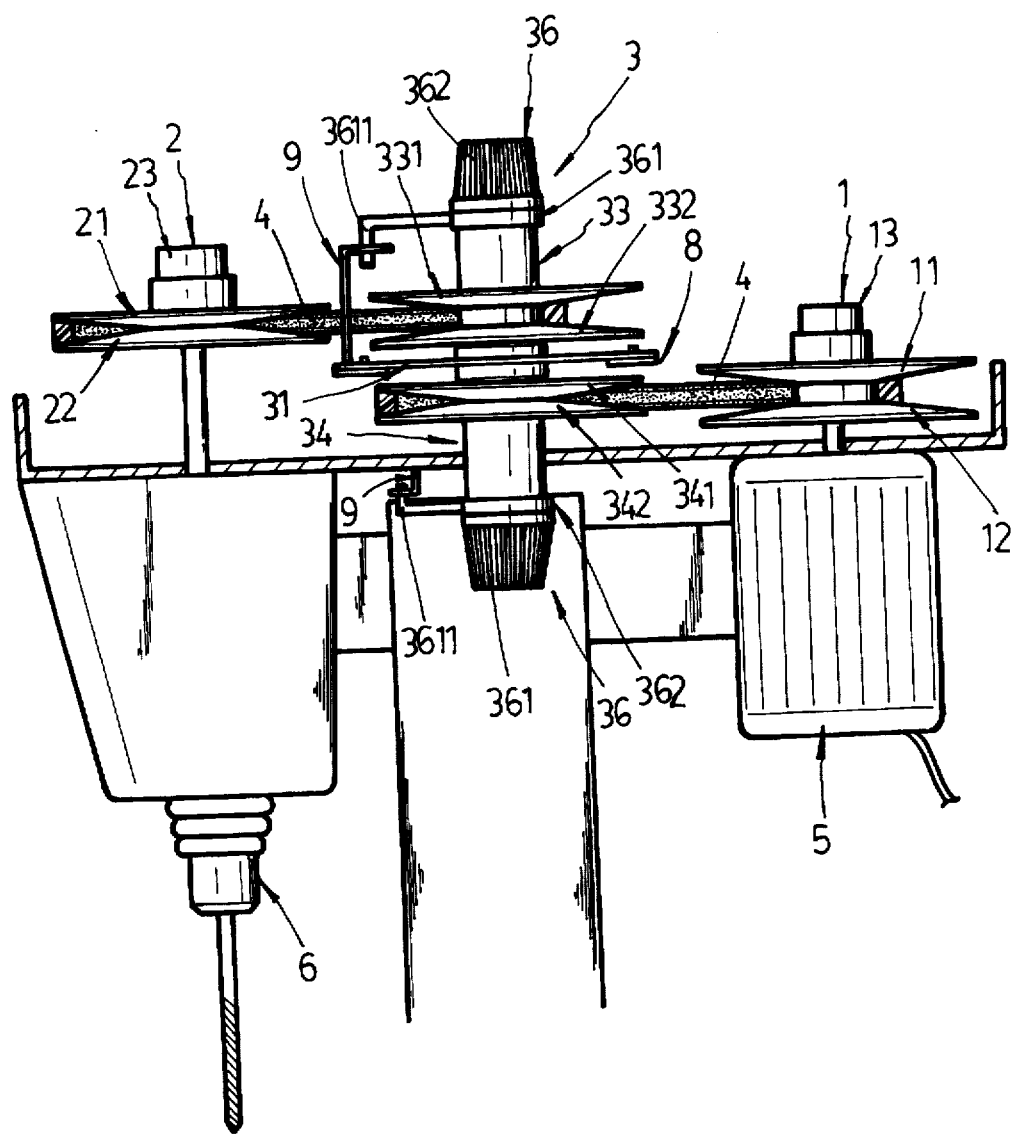
FIG. 2 is a schematic view illustrating the present invention used in a cutting metal-working machine.
Figure 3:
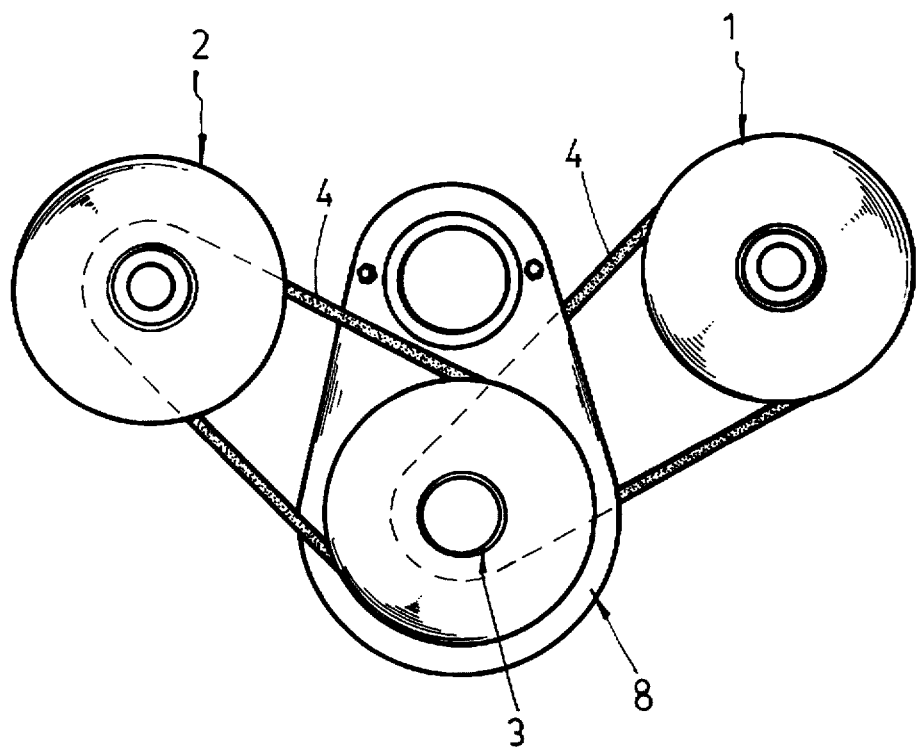
FIG. 3 is a view similar to FIG. 2, but taken from a different angle.
Figure 4:
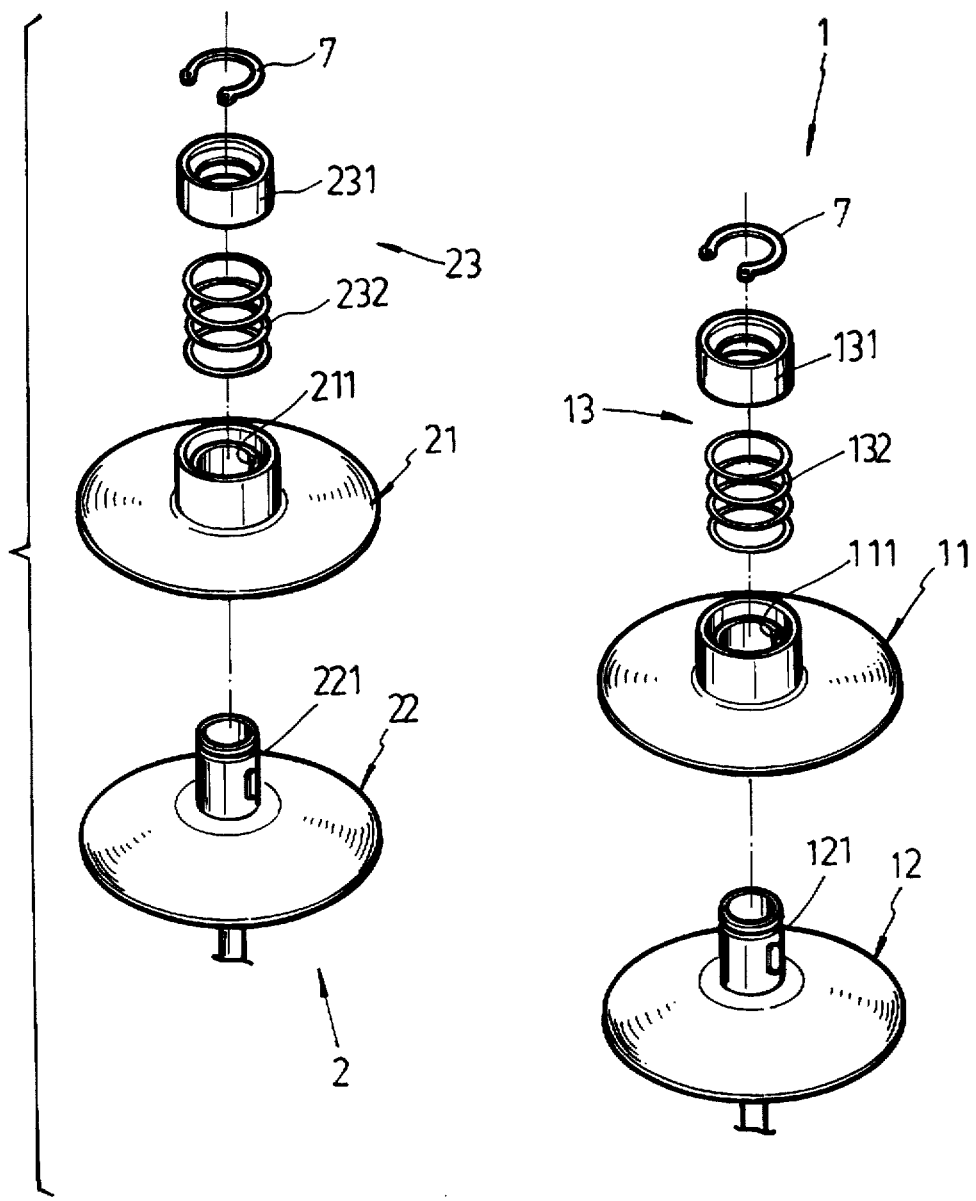
FIG. 4 is a schematic exploded view of the drive gear set and driven gear set of the present invention.
Figure 5:
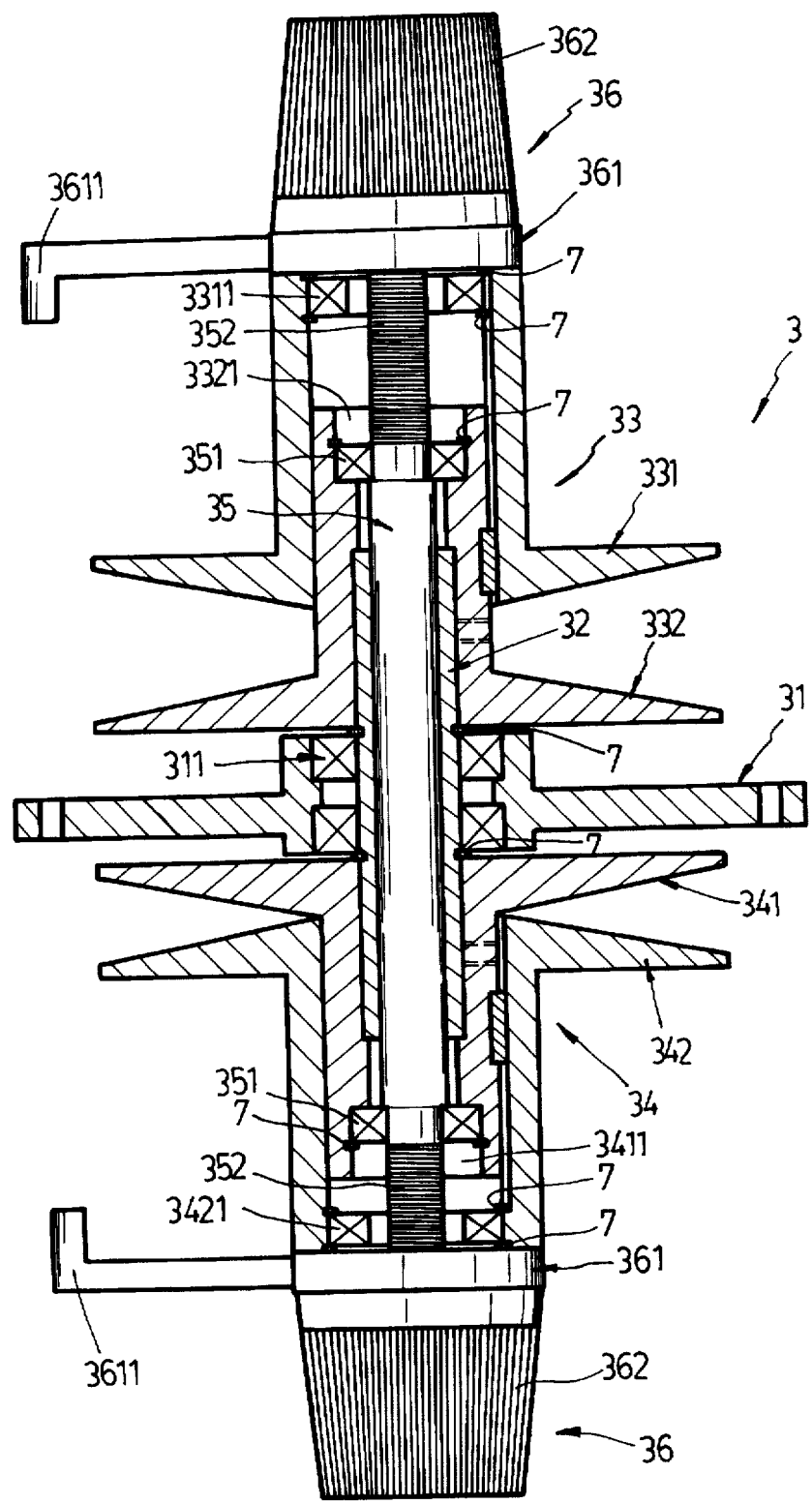
FIG. 5 is partially sectional view of the intermediate gear set of the present invention.

With reference to FIGS. 2 to 5, the stepless speed change device according to the present invention essentially comprises a drive gear set 1, a driven gear set 2, an intermediate gear set 3 and two transmission belts 4.

The drive gear set 1 is pivotally mounted on a motor 5, and the driven gear set 2 is pivotally mounted on a shaft 6. The drive gear set 1 and the driven gear set 2 are respectively provided with an upper disk 11, 21 and a lower disk 12, 22, the upper disk engaging the lower disk. A resilient seat 13, 23 is disposed between the upper disk 11, 21 and the lower disk 12, 22. The resilient seat 13, 23 includes an annular seat 131, 231 and a spring element 132, 232, the former being pressed and positioned by the latter in a recess 111, 211 of the upper disk 11, 21 of the drive gear set 1 and the driven gear set 2 respectively. The lower disk 12, 22 has a central projection at an upper side thereof for extending through the recess 111, 211 of the upper disk 11, 21. A retainer 7 is used to engage an annular groove 121, 221 of the projection of the lower disk 12, 22 so that the annular seat 132, 232 may, on the one hand, be accommodated in the recess 111, 211 of the upper disk 11, 21 urged by the spring element 131, 231 and may, on the other hand, resiliently displace on the lower disk 12, 22.

The intermediate gear set 3 is located on a baseplate 8 of the machine between the drive gear set 1 and the driven gear set 2. It comprises a support frame 31, a connecting shaft 32, a first adjusting gear 33, a second adjusting gear 34, a central shaft 35 and two rotating means 36. The support frame 31 is locked to the baseplate 8 and is centrally provided with a pivot seat 311 for pivotally receiving the connecting shaft 32.

The connecting shaft 32 is a hollow tubular structure having a retainer engaging its upper and lower end so that it may be pivotally positioned in the pivot seat 311. Both the first adjusting gear 33 and the second adjusting gear 34 are respectively provided with an upper disk 331, 341 and a lower disk 332, 342 in an engageable configuration. The lower disk 332 of the first adjusting gear 33 is fitted on and locked to the upper end of the connecting shaft 32, while the upper disk 341 of the second adjusting gear 34 is fitted on and locked to the lower end of the connecting shaft 32.

The central shaft 35 passes through the connecting shaft 32 and is provided with a bearing 351 at an upper end section and a lower end section. Each bearing 351 is positioned by means of a retainer 7 on the central shaft 35. The bearing 351 at the upper end section may fit into a top recess 3321 of the lower disk 332 of the first adjusting gear 33, while the bearing 351 at the lower end section may fit into a bottom recess 3411 of the upper disk 341 of the second adjusting gear 34. Retainers 7 are used to engage the bearings 351 so that the central shaft and the lower disk 332 of the first adjusting gear 33 and the upper disk 341 of the second adjusting gear 34 may be interconnected as a whole. Additionally, the central shaft 35 is provided with a threaded section 352 at either end.

The upper disk 331 of the first adjusting gear 33 and the lower disk 342 of the second adjusting gear 34 are each provided with a self-rotating bearing seat 3311, 3421 in an internal hole thereof. Retainers 7 are used to position the respective bearing seats 3311, 3421 which are respectively screwably connected to the threaded sections 352 at the upper and lower ends of the central shaft 35 so that the upper disk 331, 341 and the lower disk 332, 342 of the first and second adjusting gears 33, 34 engage each other such that one of the respective openings thus formed between the upper disk and the lower disk is open while the other is closed.

The two rotating devices 36 respectively assembled and positioned on the upper and lower ends of the central shaft 35. Each rotating device 36 is provided with a movable base 361 for lockably connected to a rotary shaft projecting from a top end of the bearing seat 3311, 3421 of the first and second adjusting gears 33, 34. The rotating device 36 further has a stop rod 3611 at a lateral side for fitting a baffle plate 9 for stopping the movable base 361 from rotating. The rotating device 36 further has a rotating element 362 at a top end thereof for rotating the central shaft 35. When the rotating element 362 rotates, the movable base 361 is checked and remains unmoved so that the bearing seats 3311, 3421 are guided by the threaded sections 352 to displace upwardly or downwardly. In other words, the upper disk 331 of the first adjusting gear 33 and the lower disk 342 of the second adjusting gear 34 are brought to displace vertically upwardly or downwardly, thus controlling the opening defined between the upper disk 331, 341 and the lower disk 332, 342 of the first and second adjusting gears 33, 34 and on which the transmission belts 4 are passed.

Figure 6:
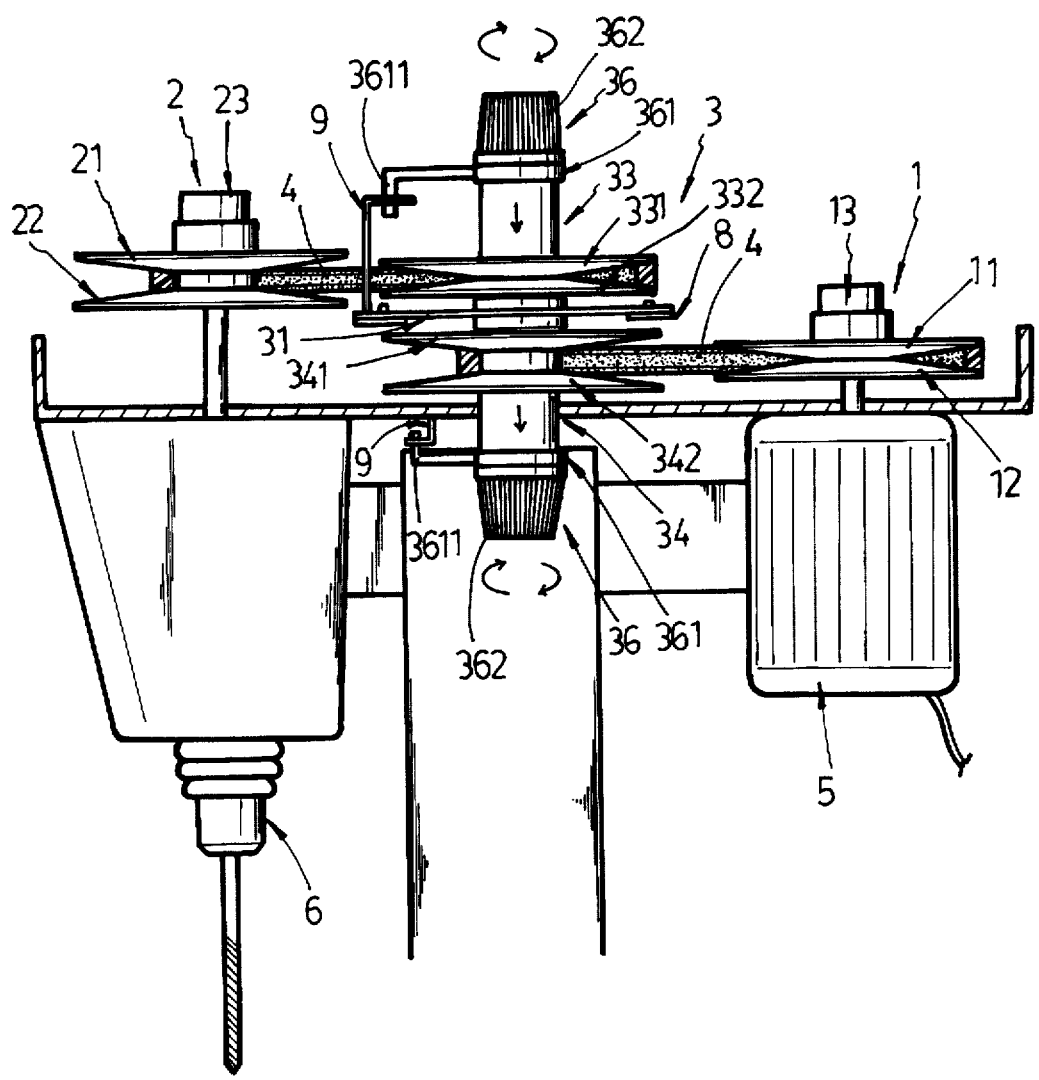
FIG. 6 is a schematic view illustrating the present invention in an assembled state.

With reference to FIG. 6, by means of the first and second adjusting gears 33, 34 of the intermediate gear set 3 on which the transmission belts 4 are passed, indirect transmission is achieved with the drive gear set 1 and the driven gear set 2. By rotating the rotating device 36 clockwise, it is possible to control the upper disk 331 of the first adjusting gear 33 to displace downwardly in a gradual manner to engage the lower disk 332, so that the transmission belt 4 fitted therebetween is squeezed and forced to gradually displace outwardly. At the same time, the upper disk 1 of the drive gear set 1, which is capable of resiliently open or close, may cause the transmission belt 4 fitted between the upper and lower disks 11, 12 of the drive gear set 1 to displace inwardly. Furthermore, when the rotating device 36 rotates in a clockwise direction, the lower disk 342 of the second second adjusting gear 34 to displace gradually downwardly to disengage from the upper disk 341, so that the transmission belt 4 fitted therebetween gradually displaces inwardly. By means of the upper disk 21 of the driven gear set 2, which is capable of resiliently open or close, the transmission belt 4 fitted between the upper and lower disks 21, 22 of the driven gear set 2 is squeezed and forced to gradually displace outwardly. Thus, the free rotating rotating devices 36 of the intermediate gear set 3 may automatically adjust the displacement of the transmission belts 4 at the first and second adjusting gears 33, 34. Relatively, the displacement of the transmission belts 4 at the drive gear set 1 and the driven gear set 2 is also adjusted, changing the speed of rotation of the drive gear set 1 and the driven gear set 2, hence achieving the object of stepless speed change.

In view of the aforesaid, the speed change device of the present invention utilizes the intermediate gear set to achieve safe and simple stepless speed adjustment to the drive gear set and the driven gear set. Besides, the arrangement of the rotating devices at the respective upper and lower ends of the intermediate gear set enable easy bidirectional speed adjustment.

Although the present invention has been illustrated and described with reference to the preferred embodiment thereof, it should be understood that it is in no way limited to the details of such embodiment but is capable of numerous modifications within the scope of the appended claims.

What is claimed is:

1. A stepless speed change device for cutting metal-working machines, comprising:

a drive gear set rotatably mounted on a motor, said drive gear set comprising a first upper disk and a first lower disk which are inter-engageable and a first resilient seat disposed therebetween so that said first upper disk and said first lower disk may resiliently open or close an opening defined therebetween;

a driven gear set pivotally mounted on a shaft, said driven gear set comprising a second upper disk and a second lower disk which are inter-engageable and a second resilient seat disposed therebetween so that said second upper disk and said second lower disk may resiliently open or close an opening defined therebetween;

an intermediate gear set disposed between said drive gear set and said driven gear set, said intermediate gear set comprising a support frame, a connecting sleeve, a first adjusting gear, a second adjusting gear, a central shaft and two rotating devices, said first adjusting gear comprising a third upper disk and a third lower disk which are inter-engageable and define an opening therebetween, said second adjusting gear comprising a fourth upper disk and a fourth lower disk which are inter-engageable and define an opening therebetween wherein said rotating devices are rotated to control the sizes of said openings of said first adjusting gear and said second adjusting gear;

two transmission belts for indirect transmission, a first transmission belt fitted between said drive gear set and said second adjusting gear, a second transmission belt fitted between said driven gear set and said first adjusting gear, wherein by means of said rotating devices of said intermediate gear set, displacement of said transmission belts fitted between said third upper disk and said third lower disk of said first adjusting gear and between said fourth lower disk of said second adjusting gear are synchronously adjusted and, due to the opening and closing of the respective upper and lower disks of said drive gear set and said driven gear set, displacement of said transmission belts fitted between said first upper disk and first lower disk of said drive gear set and between said second upper disk and said second lower disk of said driven gear set are altered to achieve a stepless speed change.

2. The stepless speed change device as claimed in claim 1, wherein each of said first and second resilient seats comprises an annular seat and a spring element fitted together, said annular seat pressing and positioning said spring element in a recess at a top end of the associated upper disk with a retainer engaging a groove in the associated lower disk to position said annular seat in said recess, so that the respective upper disk is urged against the associated lower disk by said spring element such that the associated disk may be displaced upwardly or downwardly with respect to the associated lower disk to control the size of said opening defined therebetween.

3. The stepless speed change device as claimed in claim 1, wherein said support frame of said intermediate gear set is locked and positioned on a baseplate of a machine and pivotally receives said connecting sleeve thereon, said connecting sleeve having upper and lower ends respectively locked to said first adjusting gear and to said second adjusting gear.

4. The stepless speed change device as claimed in claim 1, wherein said central shaft of said intermediate gear set is inserted through said connecting sleeve and has an upper end section and a lower end section respectively fitted with upper and lower bearings, said upper bearing insertably engaging said third lower disk of said first adjusting gear and said lower bearing insertably engaging said fourth upper disk of said second adjusting gear for pivotally positioning said central shaft on said first and second adjusting gears, and wherein said central shaft further comprises upper and lower threaded sections at the upper end and the lower end thereof, respectively, for engaging an upper self-rotating bearing seat at a top portion of said third upper disk of said first adjusting gear and a lower self-rotating at a bottom hole of said fourth lower disk of said second adjusting gear.

5. The stepless speed change device as claimed in claim 1, wherein said two rotating devices of said intermediate gear set are respectively mounted at upper and lower ends of said central shaft, said rotating devices each having a rotating element at an upper end to synchronously rotate said central shaft therewith, said rotating devices each having a movable base locked to a rotary shaft projecting from a top portion of a bearing sleeve and a stop rod extending from a side thereof with a baffle plate for stopping said movable base from rotating, such that when said rotating element rotates said central shaft, said bearing sleeve is vertically displaced to bring said third upper disk of said first adjusting gear and said fourth lower disk of said second adjusting gear to be synchronously displaced therewith.

* * * * *